United States Patent
Mishra et al.

(10) Patent No.: US 12,418,472 B2
(45) Date of Patent: Sep. 16, 2025

(54) END-TO-END DYNAMIC MULTICAST-ONLY FAST RE-ROUTE (MoFRR)

(71) Applicant: Cisco Technology, Inc., San Jose, CA (US)

(72) Inventors: Mankamana Prasad Mishra, San Jose, CA (US); Nitin Kumar, San Jose, CA (US); Luc De Ghein, Deinze (BE); Anuj Budhiraja, San Jose, CA (US); Vinish Ramachandran, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/492,890

(22) Filed: Oct. 24, 2023

(65) Prior Publication Data
US 2025/0133010 A1   Apr. 24, 2025

(51) Int. Cl.
*H04L 45/00* (2022.01)
*H04L 45/02* (2022.01)

(52) U.S. Cl.
CPC .............. *H04L 45/22* (2013.01); *H04L 45/02* (2013.01); *H04L 45/38* (2013.01)

(58) Field of Classification Search
CPC .......... H04L 45/02; H04L 45/22; H04L 45/38
USPC ....................................................... 709/238
See application file for complete search history.

(56) References Cited

U.S. PATENT DOCUMENTS

| | | | |
|---|---|---|---|
| 9,160,616 B2* | 10/2015 | Liu | H04W 4/06 |
| 9,680,734 B1 | 6/2017 | Tiruveedhula et al. | |
| 2013/0033978 A1* | 2/2013 | Eckert | H04L 45/22 370/216 |
| 2015/0003233 A1 | 1/2015 | Miclea | |
| 2015/0071055 A1 | 3/2015 | Császár et al. | |
| 2017/0093695 A1* | 3/2017 | Kebler | H04L 67/535 |
| 2017/0353382 A1 | 12/2017 | Gupta et al. | |
| 2019/0312770 A1 | 10/2019 | Bidgoli et al. | |
| 2024/0031218 A1* | 1/2024 | Posner | H04L 45/247 |
| 2024/0205131 A1* | 6/2024 | Rajamanickam | H04L 45/26 |

* cited by examiner

*Primary Examiner* — Glenford J Madamba
(74) *Attorney, Agent, or Firm* — Polsinelli P.C.

(57) ABSTRACT

In some aspects, a method for establishing a multicast-only Fast Re-Route (FRR) (MoFRR) path between a source node and a receiving node in a network, the method includes receiving, by a merged receiving node, a plurality of data packets in a data flow comprising an FRR indicator, wherein the merged receiving node is configured to identify an FRR path for data transmission to the source node, extracting, by the merged receiving node, from the FRR indicator, an identification of the source node as a destination of the data transmission, and a first identifier identifying a first data packet as part of a first flow of a MoFRR, and a second identifier identifying a second data packet as part of a second flow of a MoFRR, transmitting, by the receiving node, the first data packet along a primary data path and the second data packet along a secondary data path.

20 Claims, 10 Drawing Sheets

END-TO-END DYNAMIC MULTICAST-ONLY FAST RE-ROUTE (MoFRR)

FIELD OF THE TECHNOLOGY

The present technology relates to the field of network communication and routing technologies, specifically addressing segment routing traffic engineering. More particularly, the proposed technology encompasses methods for establishing a multicast-only Fast Re-Route (FRR) (MoFRR) path between a source node and a receiving node in a network.

BACKGROUND

Segment routing traffic engineering provides an innovative approach to monitoring networks and route data packets more efficiently and proactively. It leverages advanced monitoring techniques, such as Multi-hop BFD, SBFD, Multi-Hop PM, Path MTU discovery, and path-tracing to track the performance metrics and status of network paths closely. This real-time analysis facilitates the timely detection of anomalies, faults, or degradation in the network. Segment routing is also capable of monitoring multiple repair paths and different types of repair paths over complex networks that span multiple administrative domains. By synchronizing MTU values between primary and repair paths, packet fragmentation can be avoided during switchover events. This powerful tool provides a reliable solution for end-to-end monitoring and discovering repair paths between two nodes, maximizing the reliability and fault tolerance of network communication. The advantages of segment routing traffic engineering extend beyond just monitoring and repair paths. It also ensures that data packet delivery is optimized by quickly adapting to changes in network conditions and leveraging existing data planes for routing adjustments.

BRIEF DESCRIPTION OF THE SEVERAL VIEWS OF THE DRAWINGS

In order to describe the manner in which the features of the disclosure can be obtained, a more description of the principles of the present technology will be rendered by reference to aspects thereof which are illustrated in the appended drawings. Understanding that these drawings depict only exemplary aspects of the disclosure and are not therefore to be considered to be limiting of its scope, the principles herein are described and explained with additional specificity and detail through the use of the accompanying drawings in which.

DETAILED DESCRIPTION

Figure 1:
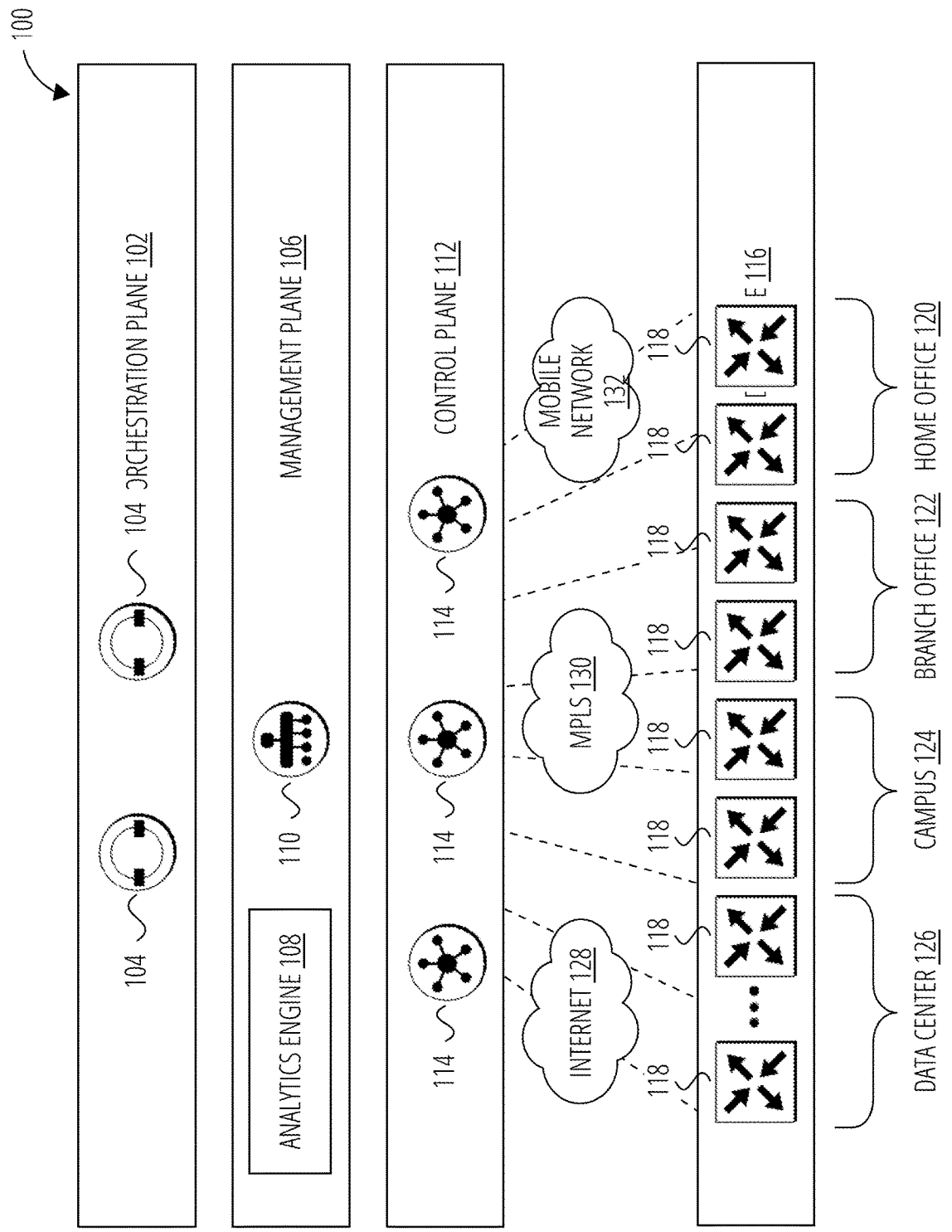
FIG. 1 illustrates an example of a high-level network architecture in accordance with some aspects of the present technology.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Multicast Fast Reroute (FRR) ensures the fast and uninterrupted delivery of multicast traffic in the event of a network failure. It's particularly important for applications and services that rely on multicast communication, such as live video streaming, online gaming, and content distribution networks. For example, in traditional multicast routing, if a link or node fails, multicast traffic can experience disruptions or outages while the network reconfigures itself to find an alternative path. By implementing MoFRR, backup paths can be precomputed for multicast traffic.

Multicast traffic is often used in scenarios like live video streaming over the Internet. When a live video stream needs to be broadcast to multiple viewers simultaneously, multicast technology offers an efficient delivery solution. Here's how it functions: a video source generates a single video stream, and instead of transmitting individual copies of this stream to each viewer, multicast technology enables the source to send a solitary copy to a multicast group address. Viewers interested in watching the live stream can join the multicast group by subscribing to this multicast group address. Network routers and switches are configured to efficiently replicate and forward the multicast traffic to all members of the multicast group. Consequently, each viewer receives and displays the video stream, ensuring that everyone in the multicast group experiences the same live content in real-time. This approach optimizes data transmission efficiency, making it particularly valuable for applications like online video streaming, webinars, and live sports broadcasts, where a single stream needs to reach a large audience simultaneously while minimizing network congestion and bandwidth consumption.

When a failure occurs in the network during a multicast transmission, the multicast FRR mechanism can quickly switch the multicast traffic to a precomputed repair path, minimizing the impact of the failure and ensuring that the multicast communication continues without interruption. This rapid rerouting capability can maintain the quality and reliability of multicast services in modern network environments.

Discovering repair paths between two nodes in the network and identifying transition points between primary and secondary paths is critical for optimizing the performance, reliability, fault tolerance, and operational efficiency of modern networks. Repair path discovery substantially elevates fault recovery and redundancy by swiftly detecting outages and seamlessly redirecting data flow along alternative routes. This proactive approach minimizes downtime, ensuring uninterrupted service and enhancing the user experience. Identifying precise transition points enhances traffic management, optimizing load distribution and alleviating congestion. Recognizing these transition points fortifies the network against common-cause failures, bolstering overall reliability.

The present disclosure is directed toward addressing network challenges caused by these common-cause failures by ensuring continuous traffic flow even if primary or backup routes fail. This is achieved by sending two join messages with distinct upstream paths, marked as primary and backup joins, and encoding information for node differentiation. Receiving nodes attempt to find separate paths for primary and backup joins, minimizing data disruption. For efficient Multi-Objective Fast Re-Route (MoFRR), nodes must possess accurate information about these paths, access similar network topologies, recognize various join types, and differentiate between combined and separate joins. This knowledge empowers MoFRR to reroute data traffic during network disruptions effectively.

In some aspects, the present disclosure addresses a method for establishing a multicast-only Fast Re-Route (FRR) (MoFRR) path between a source node and a receiving node in a network. The method includes receiving, by a merged receiving node, a plurality of data packets in a data flow comprising an FRR indicator, wherein the merged receiving node is configured to identify an FRR path for data transmission to the source node, extracting, by the merged receiving node, from the FRR indicator, an identification of the source node as a destination of the data transmission, and a first identifier identifying a first data packet as part of a first flow of a MoFRR, and a second identifier identifying a second data packet as part of a second flow of a MoFRR, transmitting, by the receiving node, the first data packet along a primary data path and the second data packet along a secondary data path.

In some aspects, the method includes where the first identifier identifies the flow as a primary join to the source node, and the second identifier identifies the flow as a secondary joint to the source node.

In some aspects, the method includes where the first identifier identifies the flow by a first flow identifier to a first source and the second identifier identifies the flow by the first flow identifier to a second source.

In some aspects, the method includes where the FRR indicator includes a type of communication for the data transmission, and a group identifier associated with the data transmission.

In some aspects, the method further includes configuring one or more network devices along the FRR path to forward data packets through an identified next available nodes towards the source node as a part of the first flow or the second flow of the MoFRR.

In some aspects, the method further includes automatically triggering utilization of the secondary data path when a failure is detected for one or more next available nodes along the primary data path, in response to the triggering, diverting the data packets to be transmitted along the FRR path to either the primary data path or the secondary data path to maintain uninterrupted communication between the source node and the receiving node.

In some aspects, the method includes where the first receiving node is configured to access a diversion policy identifying the primary data path, the secondary data path, and the FRR indicator.

In some aspects, the method further includes determining, at the merge node, a divergent path in route to the source node associated with the first and second identifier associated with each of the first data packet and the second data packet, where the divergent path includes an adjusted primary data path and secondary data path with respect to the merge node.

In some aspects, the method includes where the merge node prioritizes the transmission of the first data packet along the adjusted primary data path over the adjusted secondary data packet based on a real-time evaluation of data traffic in route to the source node.

In some aspects, the method further includes dynamically adjusting the FRR path by selecting alternate nodes or paths in response to changes in network topology.

In some aspects, a non-transitory computer-readable storage medium includes computer-readable instructions, which when executed by one or more processors of a network appliance, cause the network appliance to receive, by a merged receiving node, a request to identify an FRR path for data transmission to the source node, where the request includes an FRR indicator, extract, by the merged receiving node, from the FRR indicator, an identification of the source node as a destination of the data transmission, and a first identifier identifying a first data packet as part of a first flow of a MoFRR, and a second identifier identifying a second data packet as part of a second flow of a MoFRR, transmit, by the receiving node, the first data packet along a primary data path and the second data packet along a secondary data path.

In some aspects, a non-transitory computer-readable storage medium includes computer-readable instructions, which when executed by one or more processors of a network appliance, cause the network appliance to receive, by a merged receiving node, a request to identify an FRR path for data transmission to the source node, where the request includes an FRR indicator, extract, by the merged receiving node, from the FRR indicator, an identification of the source node as a destination of the data transmission, and a first identifier identifying a first data packet as part of a first flow of a MoFRR, and a second identifier identifying a second data packet as part of a second flow of a MoFRR, transmit, by the receiving node, the first data packet along a primary data path and the second data packet along a secondary data path.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

EXAMPLE EMBODIMENTS

Additional features and advantages of the disclosure will be set forth in the description that follows, and in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FRR serves as a critical technique in networking, swiftly responding to link or node failures by rerouting traffic along pre-calculated backup paths, thus minimizing disruptions. Nevertheless, challenges and limitations persist in its implementation, impeding the creation of distinct paths from a receiving node to a source node. The foremost challenge arises from the finite number of feasible backup paths that can be pre-computed and stored.

In intricate networks featuring an abundance of nodes and links, devising and retaining backup paths for all potential failure scenarios becomes an impractical endeavor. Furthermore, resource constraints pose a hurdle, demanding additional computational resources and memory for path calculation and upkeep. This challenge becomes pronounced in networks with restricted resources, where the capacity to process and store multiple backup paths might prove infeasible. As networks expand in complexity and size, scalability emerges as an issue. The time and resources required to compute and maintain backup paths for extensive networks can hinder the efficiency of FRR, possibly leading to delays during traffic rerouting in failure scenarios.

Managing networks can be a challenging task due to their dynamic nature. Constantly changing link conditions, traffic patterns, and topology make it difficult to depend on pre-calculated backup paths. Although FRR helps reduce downtime, it may also delay the restoration of optimal paths, which can negatively impact real-time applications. With the incorporation of various technologies and increasing complexity of networks, configuring and managing FRR mechanisms becomes an even more daunting task.

The disclosed technology provides a solution to overcome these challenges by ensuring that if the primary or backup route fails, traffic will still reach its destination. This is done by sending two join messages with different upstream paths from a provider edge node, identifying them as primary and backup joins, and encoding sufficient information for other nodes to distinguish between them. A receiving node then tries to find two different paths for the primary and backup joins to follow that include a plurality of intermediate nodes. If this is not possible, a single join message with encoding stating that it is a mix of primary and secondary joins can be sent. At any node on the route where such a join is received, nodes can try to diverge it again into separate paths, to ensure that data disruption is minimized.

For MoFRR to work efficiently, each node must possess ample information about the primary and secondary join paths. This will enable them to make accurate routing decisions. It is crucial that all nodes have access to similar network topologies and can identify various types of joins that come through them with suitable encoding. Moreover, nodes, such as merge nodes should be able to differentiate between a single join that represents both primary and secondary paths and divide it into two separate joins, if possible. With this knowledge, MoFRR can offer an effective solution for rerouting data traffic during network disruptions.

Accordingly, the proposed technology can assist with this differentiation by providing nodes with a primary join and a secondary join sent with a flow identifier and information, included in the joins is an FRR indicator that can identify that the two joins is for the same FRR path from a receiving node acting as a destination of data traffic, and a source node identified as a source of the data traffic to be received by the receiving node. In the instance where the primary and the secondary join merge at the same node (i.e. Merge node), the node will need to identify the FRR path the primary join and the secondary join belong to. Upon the merge node identifying from the FRR indicator that a different path exists, the primary join and the secondary join can be diverged by the merge node to follow each respective flow associated with their FRR paths. Upon the merge node identifying from the FRR indicator that different paths for the primary join and the secondary join do not exist, a data packet including a single join with the primary join and the secondary join can be transmitted to the next available node in the FRR path with an updated FRR indicator. The updated FRR indicator can be encoded with a flow identifier indicating that the single join in the data packet includes the primary join and the secondary join.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network device 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110. In some embodiments, the network management appliances 110 can provide centralized management of the network via a graphical user interface to enable a user to monitor, configure, and maintain the edge network devices 118 and links (e.g., Internet transport network 128, MPLS network 130, 4G/mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively or in addition, the network management appliance 110 can be a dedicated network management system for a single entity. In some embodiments, physical or virtual Cisco® SD-WAN Manage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 118.

Figure 2:
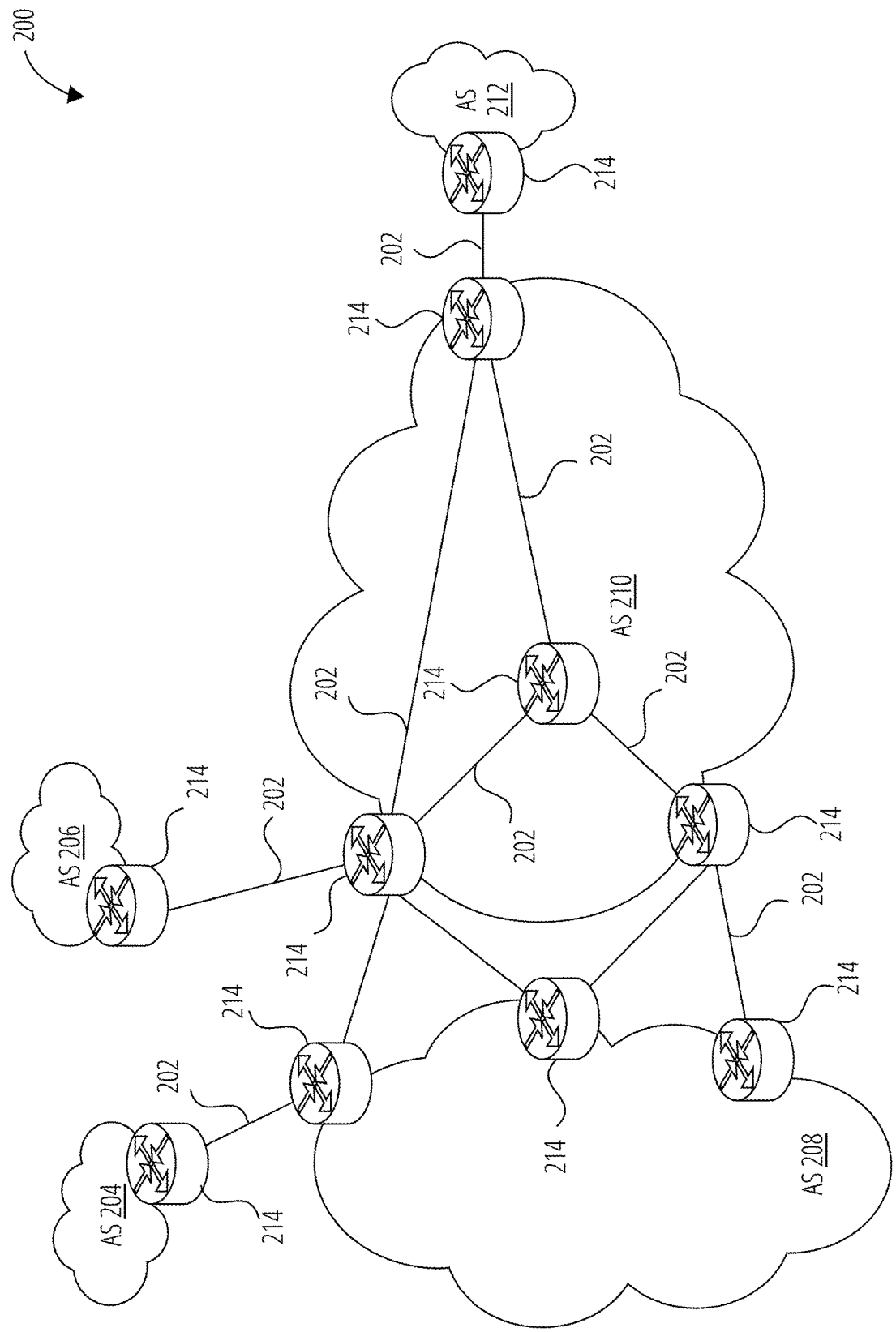
FIG. 2 illustrates an example communication network including one or more autonomous systems (ASes) according to some aspects of the present technology.

FIG. 2 illustrates an example communication network 200 including one or more autonomous systems (ASes) according to some aspects of the present technology.

A computer network 200 is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks 200 can prove burdensome, smaller groups of computer networks may be maintained as routing domains or autonomous systems. An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. Border Gateway Protocol (BGP) is an Exterior Gateway Protocol (EGP) that is used to exchange routing information among network elements (e.g., routers) in the same or different ASes. A computer host that executes a BGP process is typically referred to as a BGP host or a BGP network devices. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an AS are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 2 is a schematic block diagram of an example computer network 200 illustratively comprising network devices 214 interconnected by various methods of communication. For instance, the links 202 may be any suitable combination of wired links and shared media (e.g., wireless links, Internet Exchange Points, etc.) where certain network devices 214, such as, e.g., routers, computers, etc., may be in communication with other network devices 214, e.g., based on distance, signal strength, current operational status, location, etc. Those skilled in the art will understand that any number of network devices 214, links, etc. may be used in the computer network, and that the view shown herein is for simplicity.

Data packets (e.g., traffic and/or messages sent between the network devices 214) may be exchanged among the network devices 214 of the computer network 200 using predefined network communication protocols such as certain known wired protocols, as well as wireless protocols or other shared-media protocols where appropriate.

The computer network 200 includes a set of autonomous systems (AS) 204, 206, 208, 210 and 212. The computer network 200 may be positioned in any suitable network environment or communications architecture that operates to manage or otherwise direct information using any appropriate routing protocol or data management standard. For example, computer network 200 may be provided in conjunction with a border gateway protocol (BGP).

As noted above, an AS may be a collection of connected Internet Protocol (IP) routing network devices 214 under the control of one or more network operators that presents a common, clearly defined routing policy to a network (e.g., the Internet). Usually, an AS comprises network devices 114 that are established on the edge of the system, and that serve as the system's ingress and egress points for network traffic. Moreover, the network devices 214 may be considered edge network devices, border routers, or core network devices within the respective AS. These network devices typically, but not always, are routers or any other element of network infrastructure suitable for switching or forwarding data packets according to a routing protocol or switching protocol. For the purposes of the present disclosure, the network devices 214 located within an AS may alternatively be referred to as "forwarding network devices" or "intermediate network devices." Moreover, for illustration purposes, the ASes 204, 206, 208, 210 and 212 are shown with a limited number of network devices 214. In an actual implementation, however, an AS normally comprises numerous routers, switches, and other elements.

Each AS 204, 206, 208, 210 and 212 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the network devices 214 within the ASes, the network devices may exchange routing information to various network destinations. As described above, BGP is conventionally used to exchange routing and reachability information among network devices 214 within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (network devices 214), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., links 202, may be referred to as an "AS_PATH." The AS_PATH attribute indicates the list of ASes that must be traversed to reach the address destination. For example, as illustrated in FIG. 1, the AS 204 may store an AS_PATH attribute of "204, 206, 208, 210 and 212" where the address destination is the AS 204 (or a particular IP address within AS 212). Here, the AS_PATH attribute indicates that the path to the address destination AS 212 from AS 208 passes through ASes 204, 206 and 210, in that order.

Although it may be preferable that all network devices 214 in the respective ASes 204, 206, 208, 210 and 212 be configured according to BGP, in a real-world implementation, it may be unlikely that each network device communicates using BGP. Thus, the disclosed embodiments are applicable to scenarios where all network devices 214 in the computer network 200 are configured according to BGP, as well as scenarios where only a subset of the 214 is configured as such. Moreover, between any of the ASes, there may be a single communication path 202, e.g., between AS 204 and AS 208, as shown in FIG. 1, or there may be multiple communication paths 202, e.g., between AS 208 and AS 210. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS Path attribute of BGP update messages so that a BGP speaker can assess the validity of the AS Path in update messages that it receives. It should be understood, however, that the embodiments for implementing AS Path security disclosed herein are not limited to BGPSEC; certain embodiments may, additionally or alternatively, be applicable to other suitable protocols, including, for example, SoBGP, S-BGP, and PGPBGP, to name just a few.

Figure 3A:
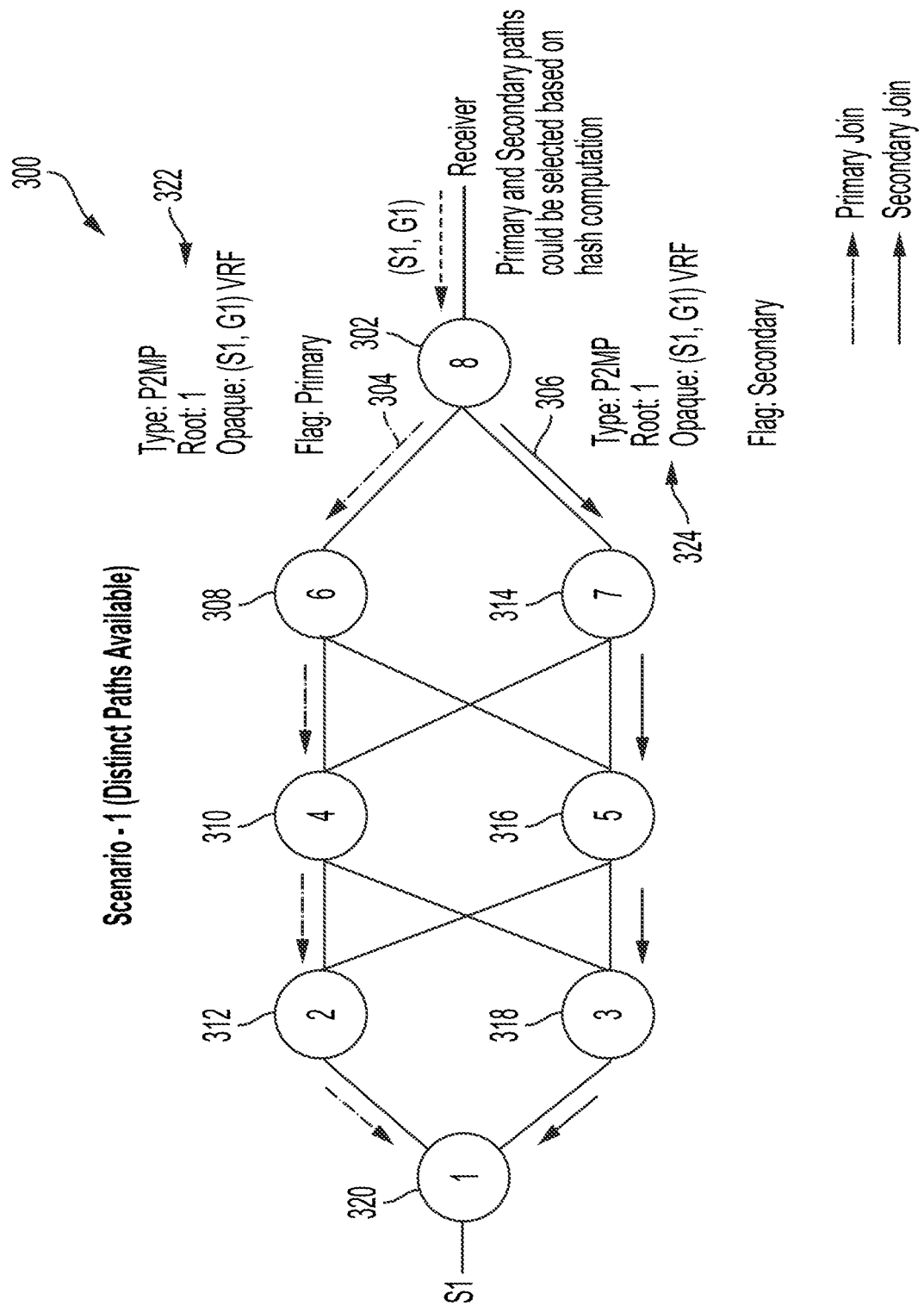
FIG. 3A depicts a single root pathway for MoFRR, including a distinct path according to some aspects of the present technology.

FIG. 3A depicts a single root MoFRR pathway 300 in a distinct path pathology according to some aspects of the present technology. The pathology in FIG. 3A depicts a source node 320 that can transmit data to a receiving node 302 via a plurality of intermediate nodes 308, 310, 312, 314, 316, and 318. In order to determine which FRR path the data packets are to be transmitted, the receiving node can receive a control message that provides signaling information including route updates to be used by the receiving node 302 when transmitting data to each of the nodes 308, 310, 312, 314, 316, and 318 in the distinct pathway 300 to transmit data to the source node 320.

The receiving node 302 is configured to identify communications paths to communicate with the source node via a primary join path 304 and a secondary join path 306. The receiving node 302 can differentiate which path the data should be transmitted via an FRR indicator in the control message. The receiving node 302 can extract from the FRR indicator, a flow type, an identification of the source node as a destination of the data transmission, a first identifier 322 identifying a first data packet as part of a primary join path 304 of the MoFRR pathway 300, and a second identifier 324 identifying a second data packet as part of a secondary join path 306 of the MoFRR pathway. In some examples, each of the first identifier 322 and the second identifier 324 can further include an opaque value that identifies source node 320 and a group identifier identifying the particular group the data packets to be transmitted are associated with.

As shown in FIG. 3A, the first identifier 322 and the second identifier 324 each identify the flow type as being a point-to-multipoint communication (P2MP). The P2MP communication is communication that is accomplished via a distinct type of one-to-many connection, providing multiple paths from a single location to multiple locations. For example, as shown in FIG. 3A that the root node, source node 320, is provided with multiple paths, primary join path 304 and secondary join path 306, to communicate with the receiving node 302. Further, each of the first identifier 322 and the second identifier 324 identify the opaque value that indicates that source node 320, S1, is the source of the data transmission to be received by the receiving node 302.

Once the receiving node 302 has determined which of the primary join path 304 and the secondary join path 306 a data packet is to be transmitted, a first data packet can be transmitted along the primary join path 304 and a second data packet can be transmitted along the secondary join path 306. As shown in FIG. 3A the primary join path 304 includes intermediate nodes that include node 308, node 310, and node 312 in route to the source node 320. The secondary join path 306 includes intermediate nodes that include node 314, node 316, and node 318.

In some examples, a merge node can be included in the single root MoFRR pathway 300, to consolidate multiple flows of data into a single transmission stream. Merge nodes are often strategically positioned in a network topology to balance the data traffic load. By consolidating data traffic from multiple FRR paths onto a single FRR path, data can be distributed more evenly across the network and prevent congestion on individual paths. In another example, the merge node can further provide redundancy and failover capabilities. If one path experiences a failure or becomes congested, the merge node can redirect traffic onto an alternative path, ensuring continued data transmission.

Figure 3B:
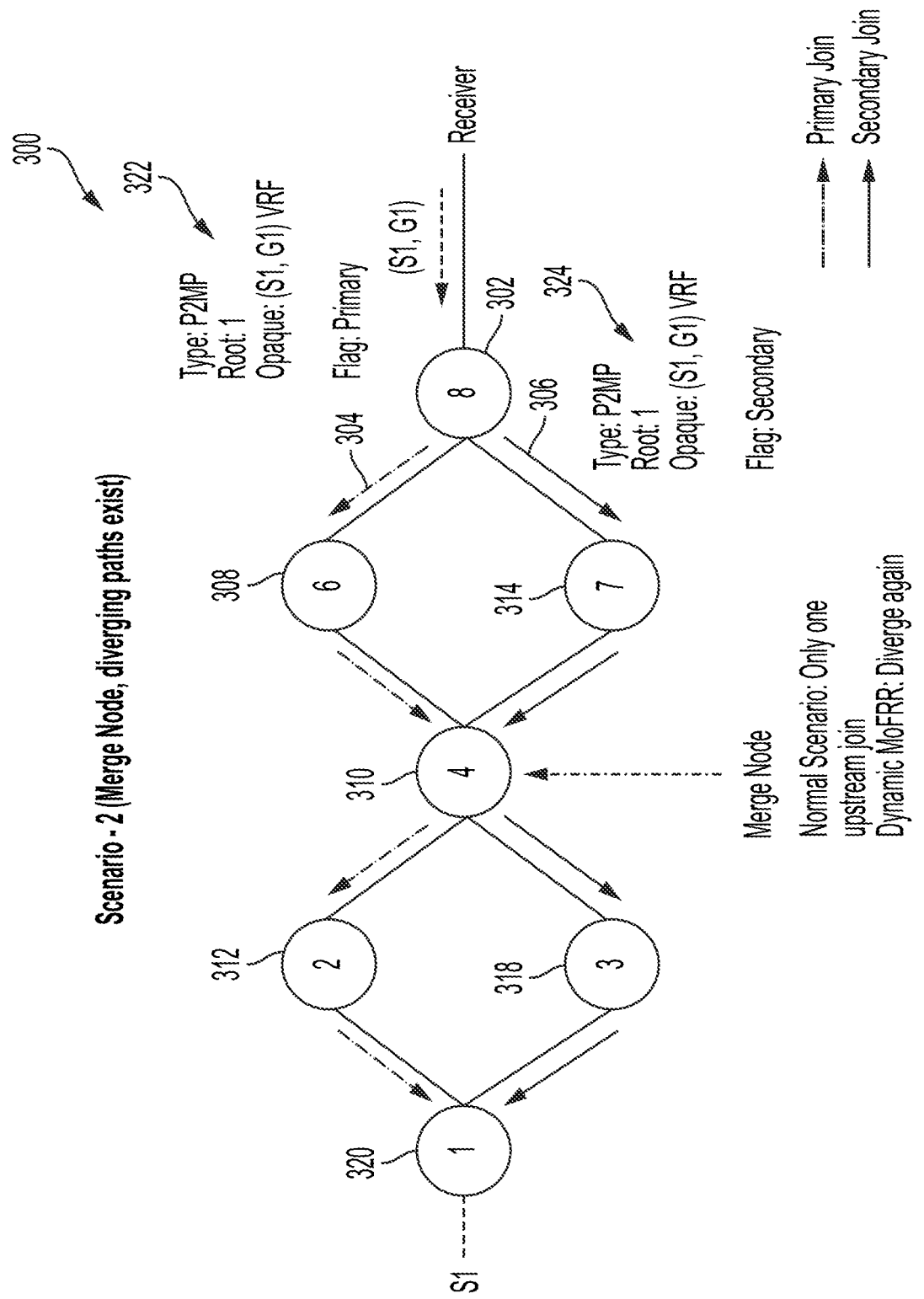
FIG. 3B depicts a single root pathway for MoFRR, including a merge node with diverging paths according to some aspects of the present technology.

FIG. 3B depicts a single root pathway for MoFRR, including a merge node with diverging paths according to some aspects of the present technology. As discussed above with reference to FIG. 3A, the receiving node can determine from the extraction of a first identifier 322 and a second identifier 324 FRR paths accessible for transmission of data to the source node 320. As shown in FIG. 3B, the receiving node 302, after extracting the first identifier 322 and the second identifier 324, can identify FRR paths for transmission of a first data packet along the primary join path 304 and a second data packet along the secondary join path 306.

Upon the first data packet and the second data packet reaching node 310, as the merge node, each of the primary join path 304 and the secondary join path 306 follow a converged FRR path 326 to the same node. Upon convergence, node 310 is configured to identify which FRR path the first data packet and the second data packet belong to. The merge node 310 can identify from the first identifier 322 and the second identifier 324 in the FRR indicator of each of the data packets that a different path exists. Accordingly, the first data packet and the second data packet can be diverged by the merge node to follow each respective flow associated with their respective FRR paths. As shown in FIG. 3B, there are diverging paths out of node 310 including the primary join path 304 that goes towards node 312, and the secondary join path 306 that diverges from primary join path 304 by going to node 318, en route to source node 320.

In some examples, a merge node can identify that different paths do not exist and that the next node in the single FRR path is intended for both the primary join path 304 and the secondary join path 306 to converge to the same node. Thus, the primary join path 304, and the secondary join path 306 are unable to be diverged into separate paths.

Figure 3C:
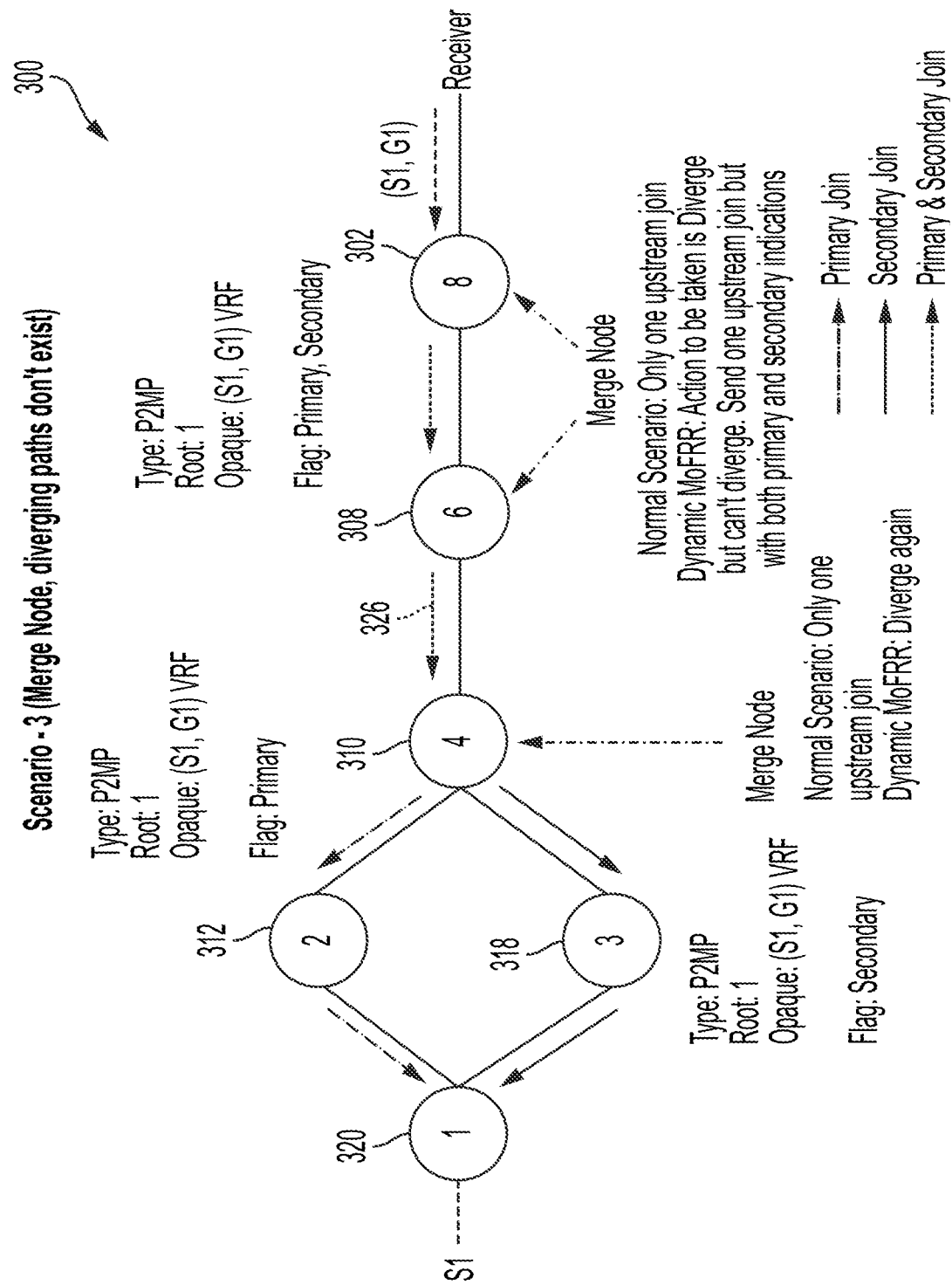
FIG. 3C depicts a single root pathway for MoFRR a merge node without diverging paths, including according to some aspects of the present technology.

FIG. 3C depicts a single root pathway for MoFRR that is initially without diverging paths according to some aspects of the present technology. As shown in FIG. 3C, the receiving node 302 receives a control message that includes an FRR indicator with a first identifier 322 and a second identifier 324. The receiving node 302 can be designated as a merge node that is configured to identify whether the primary join path 304 and the secondary join path 306 can be diverged. Upon determining at the receiving node 302 that there aren't diverging paths, the receiving node 302 can transmit a data packet along a converged FRR path 326 to a second merge node at node 308, and a third merge node at node 310.

Node 310 can extract the first identifier 322 and second identifier 324 from a control message received from node 308 on the FRR path. Accordingly, node 310 can identify from the first identifier 322 and the second identifier 324 in the FRR indicator of the data packets that a different path exists. Accordingly, the first data packet, and the second data packet can be diverged by the merge node 310 to follow each respective flow associated with their respective FRR paths. As shown in FIG. 3C, node 310 diverges the primary join path 304 towards node 312, and the secondary join path 306 to node 318, in route to source node 320.

In some instances, an additional root node can be included in pathway 300 to provide path diversity to the source node. By providing path diversity to a network pathway, the network has multiple available routes or paths to facilitate communications between a source node and a receiving node regardless of node failure, or network interruptions.

One of the primary benefits of having multiple root pathways to reach a source node is redundancy. By providing redundant paths, multiple backup routes can be provided in case one of the paths or nodes experiences a failure due to network issues, hardware failures, or other disruptions, thus enhancing network reliability and increasing fault tolerance. Additionally, by providing an additional root in the pathway 300, load balancing can be provided for data transmissions. With multiple root pathways, traffic can be distributed across these paths, preventing any single path from becoming congested, thus preventing bottlenecks.

Figure 4A:
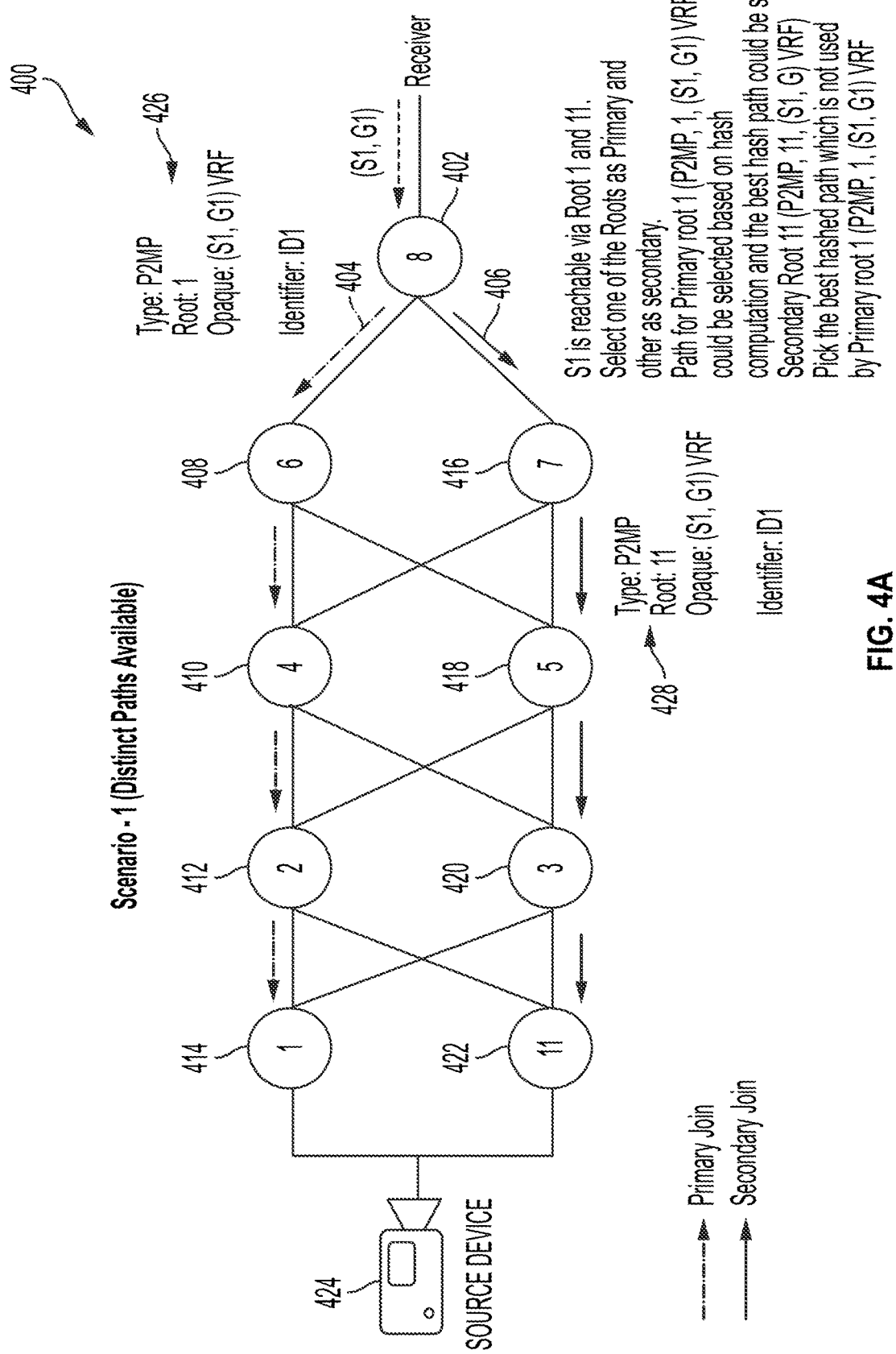
FIG. 4A depicts a multiple root pathway for MoFRR including a distinct path according to some aspects of the present technology.

Multiple root pathways include multiple root nodes that can reach a common source node. Each of the root nodes provide a pathway in which data traffic can be distributed between a receiving node and a source node. In a single root pathway as shown in FIGS. 3A-3B, only a flat is needed to identify which pathway a data packet should take to reach the same source node. In a multiple root pathway, there are multiple root nodes, that each are associated with a different pathway. Therefore, due to the multiple pathways associated with each of the root nodes, a flow identifier is needed to identify which of the pathways is associated with a particular root node serving the source node. In As such, FIG. 4A depicts a multiple root pathway 400 for MoFRR including a distinct path according to some aspects of the present technology. The pathology in FIG. 4A depicts a source device 424 that can transmit data to a receiving node 402 via a plurality of intermediate nodes 408, 410, 412, 416, 418, and 420. In order to determine which FRR path the data packets are to be transmitted, the receiving node 402 can receive a control message that includes a first identifier 426 and a second identifier 428 providing signaling information. The signaling information can include route updates to be used by the receiving node 402 when transmitting data to each of the nodes 408, 410, 412, 416, 418, and 420 in the multiple root pathway 400 to transmit data to the source device 424, via root nodes 414 and 422.

The receiving node 402 can identify communications paths to communicate with the source device 424 via a primary join path 404 and a secondary join path 406. The receiving node 402 can differentiate which path the data should be transmitted via the first identifier 426 and the second identifier 428 extracted from an FRR indicator in a control message. The receiving node 402 can extract from the FRR indicator, a flow type, an identification of the source node as a destination of the data transmission, a first identifier 426 identifying a first data packet as part of a primary join path 404 of the MoFRR multiple root pathway 400, and a second identifier 428 identifying a second data packet as part of a secondary join path 406 of the MoFRR multiple root pathway 400. In some examples, each of the first identifier 426 and the second identifier 428 can further include an opaque value that identifies source node 320 and a group identifier identifying the particular group the data packets to be transmitted are associated with.

As shown in FIG. 4A, the source device 424 can communicate with the receiving node 402 in accordance with the identification of the primary join path 404 and the secondary join path 406 extracted from the first identifier 426 and the second identifier 428. Accordingly, a first data packet can be transmitted along the primary join path 404 and a second data packet can be transmitted along the secondary join path 406 between the receiving node 402 and the source device 424. As shown in FIG. 4A, the primary join path includes intermediate nodes 408, 410, 412, and root node 414. The secondary join path 406 includes intermediate nodes 416, 418, 420, and root node 422.

In some examples, a merge node can be included in the multiple root pathway 400, to consolidate multiple flows of data into a single transmission stream, prior to identifying diverging paths to each of the root nodes 414 and 422.

Figure 4B:
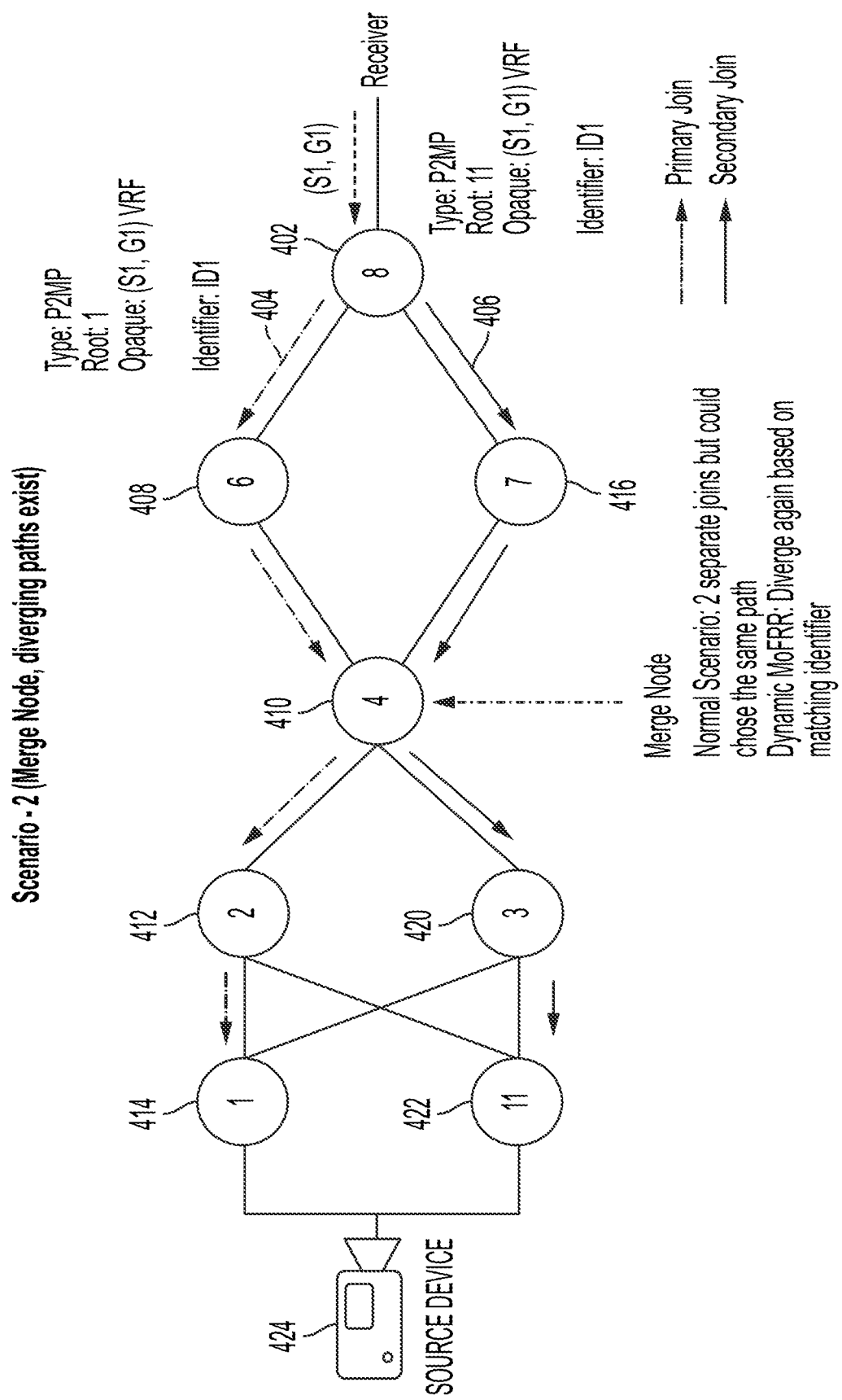
FIG. 4B depicts a multiple root pathway for MoFRR including a merge node with diverging paths according to some aspects of the present technology.

FIG. 4B depicts a multiple root pathway 400 for MoFRR, including a merge node with diverging paths according to some aspects of the present technology. As discussed above with reference to FIG. 4A, the receiving node 402 can determine from the extraction of a first identifier 426 and a second identifier 428 FRR paths accessible for transmission of data to the source device 424. As shown in FIG. 4B, the receiving node 402, upon extracting the first identifier 426 and the second identifier 428, can identify FRR paths for transmission of a first data packet along the primary join path 404 and a second data packet along the secondary join path 406.

As shown in FIG. 4B, the primary join path 404 and the secondary join path 406 can converge at a merge node, node 410, by way of intermediate node 408 along the primary join path 404, and intermediate node 416 along the secondary join path 406. Merge node 410, upon receiving a data transmission from the primary join path 404 and the secondary join path 406, can identify diverging paths for transmission of a first data packet along the primary join path 304 and a secondary data packet along the secondary join path 306. The merge node 410 can identify from the first identifier 426 and the second identifier 428 in the FRR indicator of each of the data packets that a different path exists. Accordingly, the first data packet, and the second data packet can be diverged by the merge node 410 to follow each respective flow associated with their respective FRR paths. As shown in FIG. 4B, node 410 diverges the primary join path 404 towards intermediate node 412, and the secondary join path 306 to intermediate node 420, in route to root nodes 414, and 422, respectively, serving the source device 424.

Figure 4C:
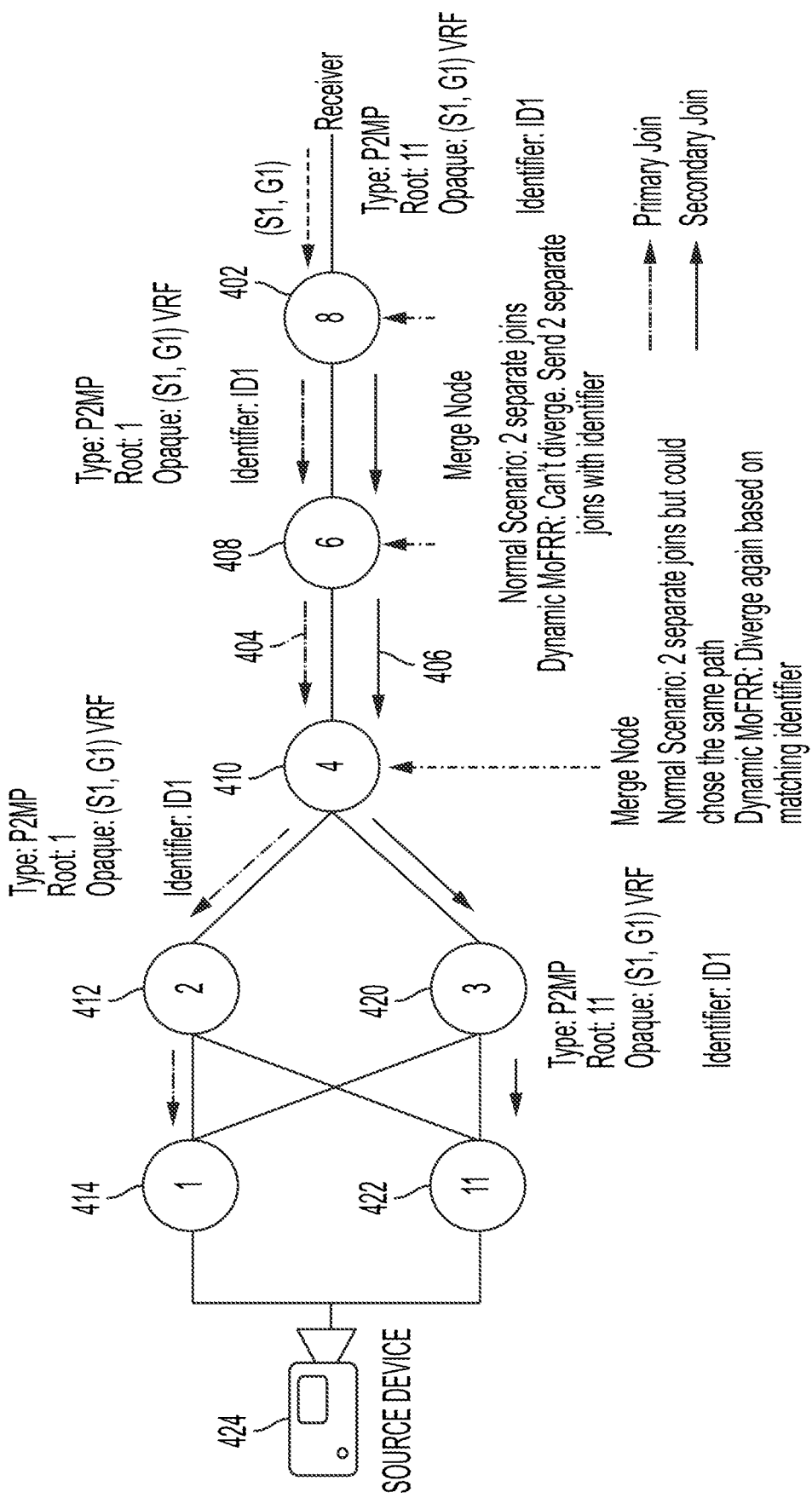
FIG. 4C depicts a multiple root pathway for MoFRR including a merge node without diverging paths according to some aspects of the present technology.

FIG. 4C depicts a multiple root pathway 400 for MoFRR including a merge node without immediately diverging paths according to some aspects of the present technology. As shown in FIG. 4C, the receiving node 402 can be designated as a merge node and configured to identify whether the primary join path 404 and the secondary join path 406 can be diverged. Upon determining at the receiving node 402 that there aren't diverging paths, the receiving node 402 can transmit a data packet along a converged FRR path including both the primary join path 404 and the secondary join path 406, to a second merge node at node 408, and a third merge node at node 410.

Node 410 can extract the first identifier 426 and second identifier 428 from a control message received from node 408 on the FRR path. Accordingly, node 410 can identify from the first identifier 426 and the second identifier 428 in the FRR indicator of each of the data packets that a different path exists. Accordingly, the first data packet, and the second data packet can be diverged by the merge node, node 410, to follow each respective flow associated with their respective FRR paths. As shown in FIG. 4C, node 410 diverges the primary join path 404 towards node 412, and the secondary join path 406 to node 420, in route to root nodes 414 and 422 serving the source device 424.

Figure 5:
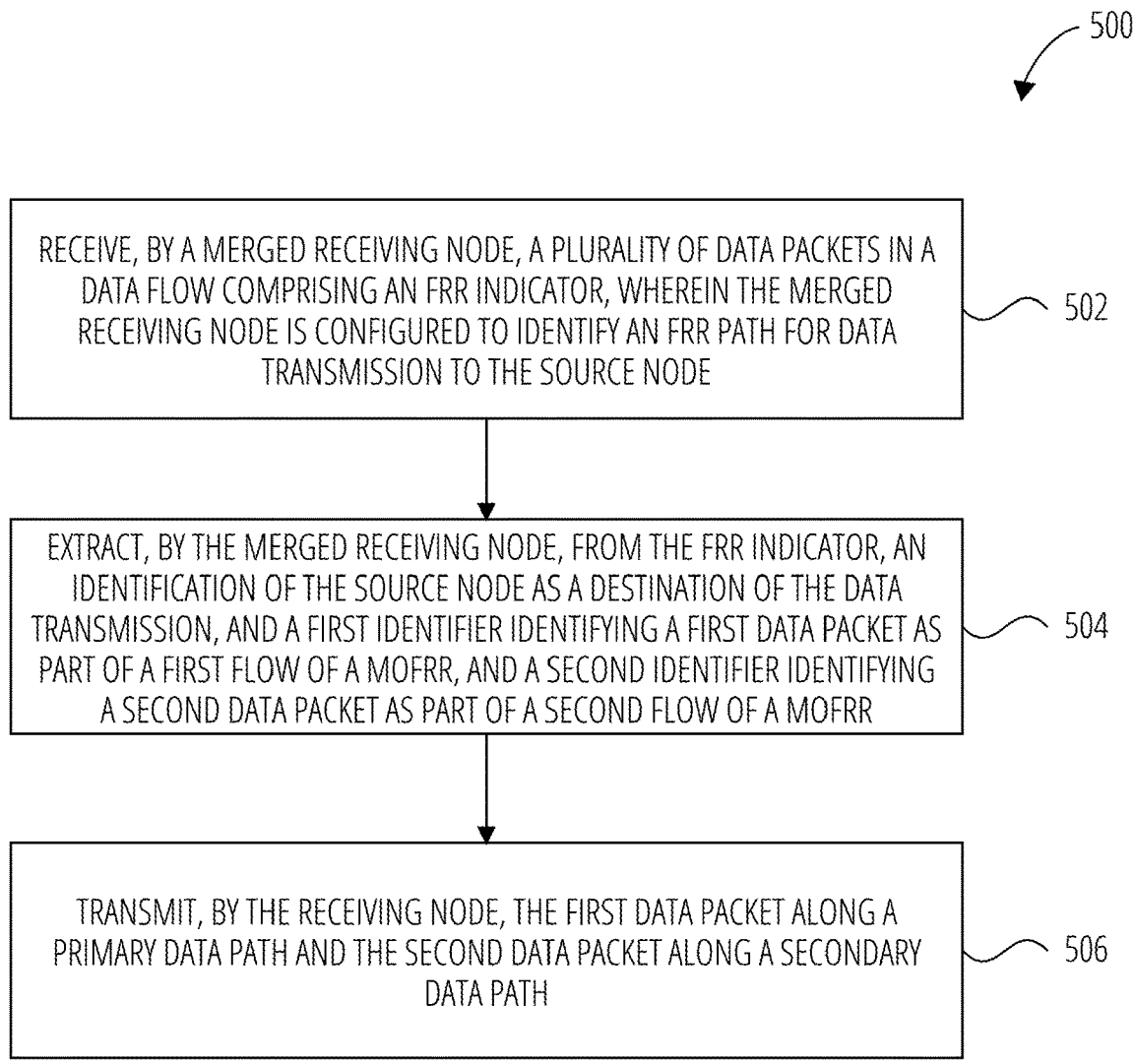
FIG. 5 illustrates an example process 500 for establishing a multicast-only Fast Re-Route (FRR) (MoFRR) path between a source node and a receiving node in a network according to some aspects of the present technology.

FIG. 5 illustrates an example process 500 for establishing a multicast-only Fast Re-Route (FRR) (MoFRR) path between a source node and a receiving node in a network according to some aspects of the present technology. For example, some of the operations depicted may be performed in parallel or in a different sequence that does not materially affect the function of the process 500. In other examples, different components of an example device or system that implements the process 500 may perform functions at substantially the same time or in a specific sequence.

According to some examples, the method includes receiving by a merged receiving node a request to identify an FRR path for data transmission to the source node at block 510. As an example, in the context of FIG. 3A, the receiving node 302 may be tasked with identifying an FRR path for transmitting data back to the source node. This request includes specific information, such as a group identifier linked to the data transmission and an FRR indicator indicating the communication type for this data transmission. The first receiving node can further access a diversion policy that defines the primary data path, the secondary data path, and how the FRR indicator should be utilized in this context.

According to some examples, the process 500 includes extracting by the merged receiving node from the FRR indicator, an identification of the source node as a destination of the data transmission, and a first identifier identifying a first data packet as part of a first flow of a MoFRR, and a second identifier identifying a second data packet as part of a second flow of a MoFRR at block 520.

For example, the receiving node 410 illustrated in FIG. 4B may extract from the FRR indicator, an identification of the root node 414 or 422 for a primary join path 404 or a secondary join path 406 to reach the source device 424 as a destination of the data transmission. Accordingly, a first identifier 426 that identifies root node 414 associated with a first data packet as part of a primary join path 404 of a MoFRR, and a second identifier 428 that identifies root node 422 associated with a second data packet as part of a secondary join path 406 of a MoFRR. The first identifier 426 can identify the primary join path 404 as a primary join to the source node, and the second identifier 428 can identify the secondary join path 406 as a secondary join to the source node, root node 414, or root node 422. The first identifier 426 can identify the flow by a first flow identifier to a first source and the second identifier identifies the flow by the second flow identifier to a second source.

In some examples, the receiving node 302 illustrated in FIG. 3B may extract from the first identifier 322 an identification of source node 320, receiving node 308 configured to receive a data packet along the primary join path 304, and receiving node 314 configured to receive a data packet along the second identifier 324.

Further, the method comprises diverging the data packets to be transmitted along the FRR path to either the primary data path or the secondary data path to maintain uninterrupted communication between the source node and the receiving node. For example, node 410 illustrated in FIG. 4B may diverge the data packets to be transmitted along the FRR path to either the primary join path 404 or the secondary join path 406 to maintain uninterrupted communication between the source device 424 and the receiving node 402.

Further, the process 500 comprises determining at the merge node a divergent path in route to the source node associated with the first and second identifier associated with each of the first data packet and the second data packet. For example, the merge node, node 310, illustrated in FIG. 3B may determine at the merge node a divergent path in route to the source node associated with the first identifier 322 and second identifiers 324 associated with each of the first data packet and the second data packet. The divergent path can include an adjusted primary join path 304 and secondary join path 306 with respect to the receiving node 302. The merge node, node 310, prioritizes the transmission of the first data packet along the adjusted primary join path 304 over the secondary data packet based on a real-time evaluation of data traffic in route to the source node 320.

According to some examples, the method includes transmitting by the receiving node the first data packet along a primary data path and the second data packet along a secondary data path at block 530. For example, the node 410 illustrated in FIG. 4B may transmit by the receiving node 410 the first data packet along a primary join path 404 and the second data packet along a secondary join path 406.

Further, the method can comprise configuring one or more network devices along the FRR path to forward data packets through an identified next available nodes towards the source node as a part of the first flow or the second flow of the MoFRR. For example, node 408 and node 416 illustrated in FIG. 4A may configure one or more network devices along the FRR path to forward data packets through an identified next available nodes towards the source node as a part of the first flow or the second flow of the MoFRR. As shown in FIG. 4A, node 408 is configured to be in communication with next available nodes 410, 412, and root node 414, in route to source device 424. Additionally, node 416 is configured to be in communication with next available node 418, 420, and root node 422 in route to source device 424.

Figure 6:
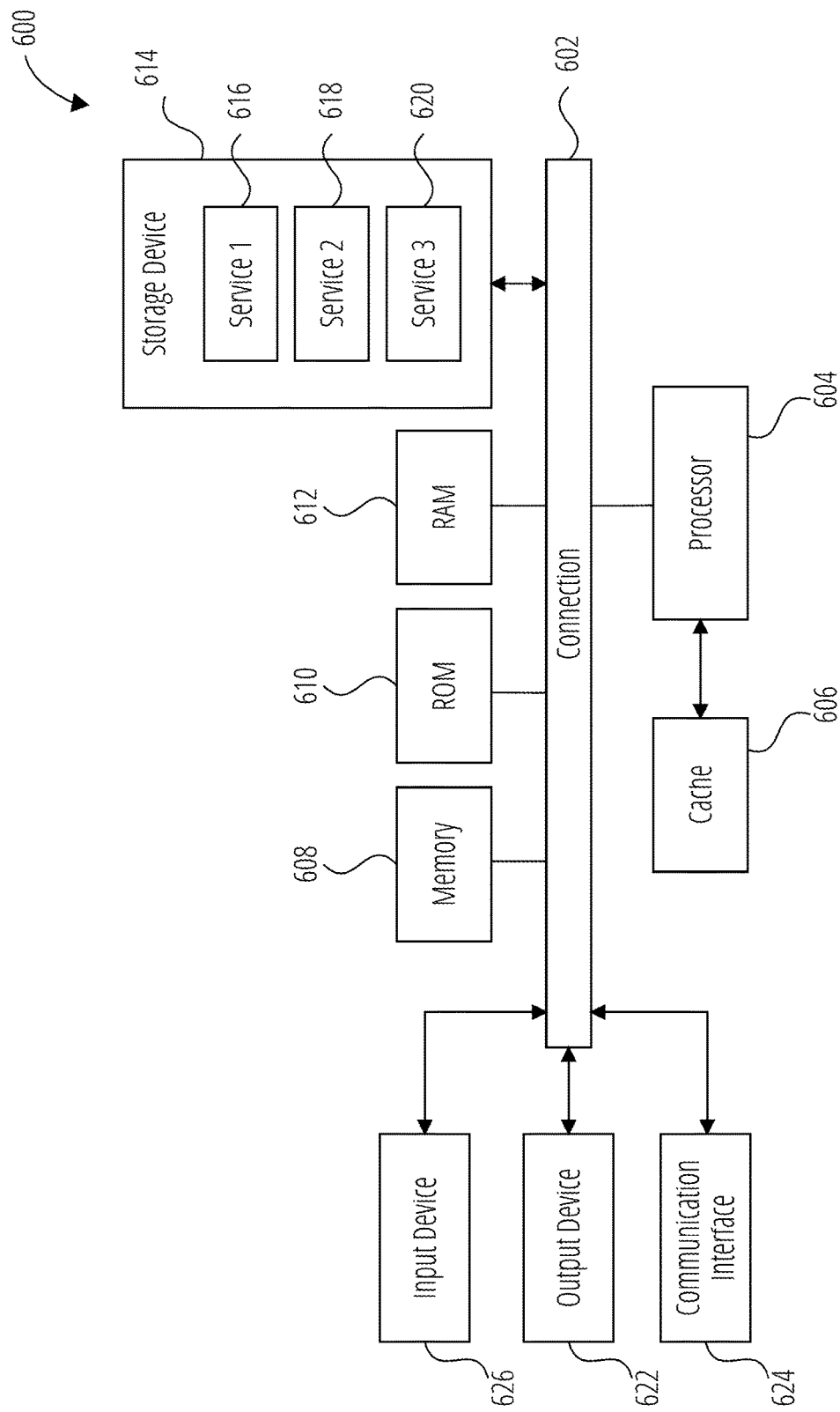
FIG. 6 illustrates an example of a computing system according to some aspects of the present technology.

FIG. 6 shows an example of computing system 600, which can be for example any computing device making up a system network, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (central processing unit (CPU) or processor) and connection 602 that couples various system components including system memory 608, such as read-only memory (ROM) 610 and random access memory (RAM) 612 to processor 604. Computing system 600 can include a cache of high-speed memory 608 connected directly with, in close proximity to, or integrated as part of processor 604.

Processor 604 can include any general-purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the hardware components, such as processor 604, connection 602, output device 622, etc., to carry out the function.

For clarity of explanation, in some instances, the present technology may be presented as including individual functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and performs one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data that cause or otherwise configure a general-purpose computer, special-purpose computer, or special-purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein can also be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some aspects of the present technology include:

Clause 1. A method for establishing a multicast-only fast re-route (FRR) (MoFRR) path between a source node and a receiving node in a network, the method comprising: receiving, by a merged receiving node, a plurality of data packets in a data flow comprising an FRR indicator, wherein the merged receiving node is configured to identify an FRR path for data transmission to the source node; extracting, by the merged receiving node, from the FRR indicator, an identification of the source node as a destination of the data transmission, and a first identifier identifying a first data packet as part of a first flow of a MoFRR, and a second identifier identifying a second data packet as part of a second flow of a MoFRR; transmitting, by the receiving node, the first data packet along a primary data path and the second data packet along a secondary data path.

Clause 2. The method of clause 1, wherein the first identifier identifies the flow as a primary join to the source node, and the second identifier identifies the flow as a secondary joint to the source node.

Clause 3. The method of clause 1, wherein the first identifier identifies the flow by a first flow identifier to a first source and the second identifier identifies the flow by the first flow identifier to a second source.

Clause 4. The method of clause 1, wherein the FRR indicator includes a type of communication for the data transmission, and a group identifier associated with the data transmission.

Clause 5. The method of clause 1, further comprising: configuring one or more network devices along the FRR path to forward data packets through an identified next available nodes towards the source node as a part of the first flow or the second flow of the MoFRR.

Clause 6. The method of clause 1, further comprising: automatically triggering utilization of the secondary data path when a failure is detected for one or more next available nodes along the primary data path; in response to the triggering, diverting the data packets to be transmitted along the FRR path to either the primary data path or the secondary data path to maintain uninterrupted communication between the source node and the receiving node.

Clause 7. The method of clause 1, wherein the first receiving node is configured to access a diversion policy identifying the primary data path, the secondary data path, and the FRR indicator.

Clause 8. The method of clause 1, further comprising: determining, at the merge node, a divergent path in route to the source node associated with the first and second identifier associated with each of the first data packet and the second data packet, wherein the divergent path includes an adjusted primary data path and secondary data path with respect to the merge node.

Clause 9. The method of clause 8, wherein the merge node prioritizes the transmission of the first data packet along the adjusted primary data path over the adjusted secondary data packet based on a real-time evaluation of data traffic in route to the source node.

Clause 10. The method of clause 1, further comprising: dynamically adjusting the FRR path by selecting alternate nodes or paths in response to changes in network topology.

Clause 11. A network device comprising: one or more memories having computer-readable instructions stored therein; and one or more processors configured to execute the computer-readable instructions to: receive, by a merged receiving node, a request to identify an FRR path for data transmission to the source node, wherein the request comprises an FRR indicator; extract, by the merged receiving node, from the FRR indicator, an identification of the source node as a destination of the data transmission, and a first identifier identifying a first data packet as part of a first flow of a MoFRR, and a second identifier identifying a second data packet as part of a second flow of a MoFRR; transmit, by the receiving node, the first data packet along a primary data path and the second data packet along a secondary data path.

Clause 12. The network device of clause 11, wherein the first identifier identifies the flow as a primary join to the source node, and the second identifier identifies the flow as a secondary joint to the source node.

Clause 13. The network device of clause 11, wherein the first identifier identifies the flow by a first flow identifier to a first source and the second identifier identifies the flow by the first flow identifier to a second source.

Clause 14. The network device of clause 11, further comprising: configuring one or more network devices along the FRR path to forward data packets through an identified next available nodes towards the source node as a part of the first flow or the second flow of the MoFRR.

Clause 15. The network device of clause 11, further comprising: automatically triggering utilization of the secondary data path when a failure is detected for one or more next available nodes along the primary data path; in response to the triggering, diverting the data packets to be transmitted along the FRR path to either the primary data path or the secondary data path to maintain uninterrupted communication between the source node and the receiving node.

Clause 16. The network device of clause 11, further comprising: determining, at the merge node, a divergent path in route to the source node associated with the first and second identifier associated with each of the first data packet and the second data, wherein the divergent path includes an adjusted primary data path and secondary data path with respect to the merge node.

Clause 17. A non-transitory computer-readable storage medium comprising computer-readable instructions, which when executed by one or more processors of a network appliance, cause the network appliance to: receive, by a merged receiving node, a request to identify an FRR path for data transmission to the source node, wherein the request comprises an FRR indicator; extract, by the merged receiving node, from the FRR indicator, an identification of the source node as a destination of the data transmission, and a first identifier identifying a first data packet as part of a first flow of a MoFRR, and a second identifier identifying a second data packet as part of a second flow of a MoFRR; transmit, by the receiving node, the first data packet along a primary data path and the second data packet along a secondary data path.

Clause 18. The non-transitory computer-readable storage medium of clause 17, wherein the first identifier identifies the flow as a primary join to the source node, and the second identifier identifies the flow as a secondary joint to the source node.

Clause 19. The non-transitory computer-readable storage medium of clause 17, wherein the first identifier identifies the flow by a first flow identifier to a first source and the second identifier identifies the flow by the first flow identifier to a second source.

Clause 20. The non-transitory computer-readable storage medium of clause 17, wherein the one or more processors are further configured to: configure one or more network devices along the FRR path to forward data packets through an identified next available nodes towards the source node as a part of the first flow or the second flow of the MoFRR.

Clause 21. The non-transitory computer-readable storage medium of clause 17, wherein the one or more processors are further configured to: automatically trigger utilization of the secondary data path when a failure is detected for one or more next available nodes along the primary data path; in response to the triggering, diverting the data packets to be transmitted along the FRR path to either the primary data path or the secondary data path to maintain uninterrupted communication between the source node and the receiving node.

Clause 22. The non-transitory computer-readable storage medium of clause 17, wherein the one or more processors are further configured to: determine, at the merge node, a divergent path in route to the source node associated with the first and second identifier associated with each of the first data packet and the second data, wherein the divergent path includes an adjusted primary data path and secondary data path with respect to the merge node.end-to-end dynamic multicast-only fast re-route (MoFRR)

What is claimed is:

1. A method for establishing a multicast-only Fast Re-Route (FRR) (MoFRR) path between a source node and a receiving node in a network, the method comprising:
   receiving, by a merged receiving node, a plurality of data packets in a data flow comprising an FRR indicator, wherein the merged receiving node is configured to identify an FRR path for data transmission to the source node, wherein the merged receiving node is in a primary data path and a secondary data path, and wherein the FRR indicator indicates a communication type for the plurality of data packets;
   extracting, by the merged receiving node, from the FRR indicator, an identification of the source node as a destination of the data transmission, and a first identifier identifying a first data packet as part of a first flow of a MoFRR to be routed down the primary data path, and a second identifier identifying a second data packet as part of a second flow of a MoFRR to be routed down the secondary data path; and
   transmitting, by the merged receiving node, the first data packet along the primary data path and the second data packet along the secondary data path, wherein the transmitting includes dynamically adjusting the primary data path and the secondary data path based on one or more network conditions of one or more received nodes along the primary data path.

2. The method of claim 1, wherein the first identifier identifies the data flow as a primary join to the source node, and the second identifier identifies the data flow as a secondary join to the source node.

3. The method of claim 1, wherein the first identifier identifies the data flow by a first flow identifier to a first source and the second identifier identifies the data flow by the first flow identifier to a second source.

4. The method of claim 1, further comprising:
   configuring one or more network devices along the FRR path to forward data packets through an identified next available node towards the source node as a part of the first flow or the second flow of the MoFRR.

5. The method of claim 1, further comprising:
   automatically triggering utilization of the secondary data path when a failure is detected for one or more next available nodes along the primary data path; and
   in response to the triggering, diverting the data packets to be transmitted along the FRR path to either the primary data path or the secondary data path to maintain uninterrupted communication between the source node and the receiving node.

6. The method of claim 1, further comprising:
   determining, at the merged receiving node, a divergent path in route to the source node associated with the first and second identifier associated with each of the first data packet and the second data packet, wherein the divergent path includes an adjusted primary data path and secondary data path with respect to the merged receiving node.

7. The method of claim 6, wherein the merged receiving node prioritizes the transmission of the first data packet along the adjusted primary data path over the adjusted secondary data packet based on a real-time evaluation of data traffic in route to the source node.

8. The method of claim 1, further comprising:
   dynamically adjusting the FRR path by selecting alternate nodes or paths in response to changes in network topology.

9. A network device comprising:
   one or more memories having computer-readable instructions stored therein; and
   one or more processors configured to execute the computer-readable instructions to:
      receive, by a merged receiving node, a plurality of data packets in a data flow comprising an FRR indicator, wherein the merged receiving node is configured to identify an FRR path for data transmission to a source node, wherein the merged receiving node is in a primary data path and a secondary data path, and wherein the FRR indicator indicates a communication type for the plurality of data packets;
      extract, by the merged receiving node, from the FRR indicator, an identification of the source node as a destination of the data transmission, and a first identifier identifying a first data packet as part of a first flow of a MoFRR to be routed down the primary data path, and a second identifier identifying a second data packet as part of a second flow of a MoFRR to be routed down the secondary data path;

transmit, by the merged receiving node, the first data packet along the primary data path and the second data packet along the secondary data path, wherein the transmitting includes dynamically adjusting the primary data path and the secondary data path based on one or more network conditions of one or more received nodes along the primary data path.

10. The network device of claim 9, wherein the first identifier identifies the data flow as a primary join to the source node, and the second identifier identifies the data flow as a secondary join to the source node.

11. The network device of claim 9, wherein the first identifier identifies the data flow by a first flow identifier to a first source and the second identifier identifies the data flow by the first flow identifier to a second source.

12. The network device of claim 9, further comprising:
configuring one or more network devices along the FRR path to forward data packets through an identified next available node towards the source node as a part of the first flow or the second flow of the MoFRR.

13. The network device of claim 9, further comprising:
automatically triggering utilization of the secondary data path when a failure is detected for one or more next available nodes along the primary data path; and
in response to the triggering, diverting the data packets to be transmitted along the FRR path to either the primary data path or the secondary data path to maintain uninterrupted communication between the source node and the receiving node.

14. The network device of claim 9, further comprising:
determining, at the merged receiving node, a divergent path in route to the source node associated with the first and second identifier associated with each of the first data packet and the second data, wherein the divergent path includes an adjusted primary data path and secondary data path with respect to the merged receiving node.

15. A non-transitory computer-readable storage medium comprising computer-readable instructions, which when executed by one or more processors of a network appliance, cause the network appliance to:
receive, by a merged receiving node, a plurality of data packets in a data flow comprising an FRR indicator, wherein the merged receiving node is configured to identify an FRR path for data transmission to a source node, wherein the merged receiving node is in a primary data path and a secondary data path, and wherein the FRR indicator indicates a communication type for the plurality of data packets;

extract, by the merged receiving node, from the FRR indicator, an identification of the source node as a destination of the data transmission, and a first identifier identifying a first data packet as part of a first flow of a MoFRR to be routed down the primary data path, and a second identifier identifying a second data packet as part of a second flow of a MoFRR to be routed down the secondary data path;

transmit, by the merged receiving node, the first data packet along the primary data path and the second data packet along the secondary data path, wherein the transmitting includes dynamically adjusting the primary data path and the secondary data path based on one or more network conditions of one or more received nodes along the primary data path.

16. The non-transitory computer-readable storage medium of claim 15, wherein the first identifier identifies the data flow as a primary join to the source node, and the second identifier identifies the data flow as a secondary join to the source node.

17. The non-transitory computer-readable storage medium of claim 15, wherein the first identifier identifies the data flow by a first flow identifier to a first source and the second identifier identifies the data flow by the first flow identifier to a second source.

18. The non-transitory computer-readable storage medium of claim 15, wherein the one or more processors are further configured to:
configure one or more network devices along the FRR path to forward data packets through an identified next available node towards the source node as a part of the first flow or the second flow of the MoFRR.

19. The non-transitory computer-readable storage medium of claim 15, wherein the one or more processors are further configured to:
automatically trigger utilization of the secondary data path when a failure is detected for one or more next available nodes along the primary data path; and
in response to the triggering, diverting the data packets to be transmitted along the FRR path to either the primary data path or the secondary data path to maintain uninterrupted communication between the source node and the receiving node.

20. The non-transitory computer-readable storage medium of claim 15, wherein the one or more processors are further configured to:
determine, at the merged receiving node, a divergent path in route to the source node associated with the first and second identifier associated with each of the first data packet and the second data, wherein the divergent path includes an adjusted primary data path and secondary data path with respect to the merged receiving node.

* * * * *